United States Patent
Yang

(10) Patent No.: US 7,192,133 B1
(45) Date of Patent: Mar. 20, 2007

(54) PAIR OF SUNGLASSES WITH FARSIGHTED LENSES

(76) Inventor: Morgan Yang, P.O. Box 90, Tainan City 70499 (TW)

(*) Notice: Subject to any disclaimer, the term of this patent is extended or adjusted under 35 U.S.C. 154(b) by 0 days.

(21) Appl. No.: 11/219,836

(22) Filed: Sep. 7, 2005

(51) Int. Cl.
*G02C 7/10* (2006.01)

(52) U.S. Cl. ............... 351/44; 351/61; 351/154; 351/172; 351/178

(58) Field of Classification Search ............... 351/41, 351/44, 45, 54, 55, 61, 154, 159, 172, 178
See application file for complete search history.

(56) References Cited

U.S. PATENT DOCUMENTS

| | | | | |
|---|---|---|---|---|
| 5,793,467 A | * | 8/1998 | Bailey | 351/172 |
| 6,976,757 B2 | * | 12/2005 | DeFazio | 351/164 |
| 2005/0213032 A1 | * | 9/2005 | Delery et al. | 351/178 |

* cited by examiner

*Primary Examiner*—Huy K. Mai

(57) ABSTRACT

A pair of sunglasses with farsighted lenses includes a main body having a frame surrounding two separate areas. Each of the areas is occupied by a sunlight glass having an opening cut at its lower and inner part. The opening is to be filled with a farsighted lens provided with a fixing groove around its circumference for fitting with the circumferential edge of the opening.

3 Claims, 2 Drawing Sheets

PAIR OF SUNGLASSES WITH FARSIGHTED LENSES

BACKGROUND OF THE INVENTION

1. Field of the Invention

This invention relates to a pair of sunglasses, particular to one that includes a main body having a frame surrounding two separate areas. Each of the areas is occupied by a sunglass having an opening cut at its lower and inner part. The opening is to be filled with a farsighted lens provided with a fixing groove around its circumference for fitting with a circumferential edge of the opening.

2. Description of the Prior Art

Usually, as people do outdoors activities, colored sunglasses are often worn to keep eyes from being attacked by the strong sunlight. But, conventional sunglasses are not suitably made for presbyopia correction because their colored lenses are too dark to provide enough brightness for seeing clearly small objects near by. Therefore, it's always necessary to carry two pairs of glasses for alternative usage for those who, suffering with presbyopia, have to contact with the sunlight often. The present invention is aimed to avoid such an annoying situation.

SUMMARY OF THE INVENTION

The prime object of this invention is to offer multi-functional sunglasses, with each sunglass provided with a farsighted lens.

The main characteristics of the invention are a main body provided with a frame surrounding two separate areas. Each of the area is occupied by a sunglass having an opening cut at its lower and inner part. The opening is to be filled with a farsighted lens provided with a fixing groove around its circumference for fixing up with the opening.

BRIEF DESCRIPTION OF DRAWINGS

This invention is better understood by referring to the accompanying drawings, wherein.

DETAILED DESCRIPTION OF THE PREFERRED EMBODIMENT

Figure 1:
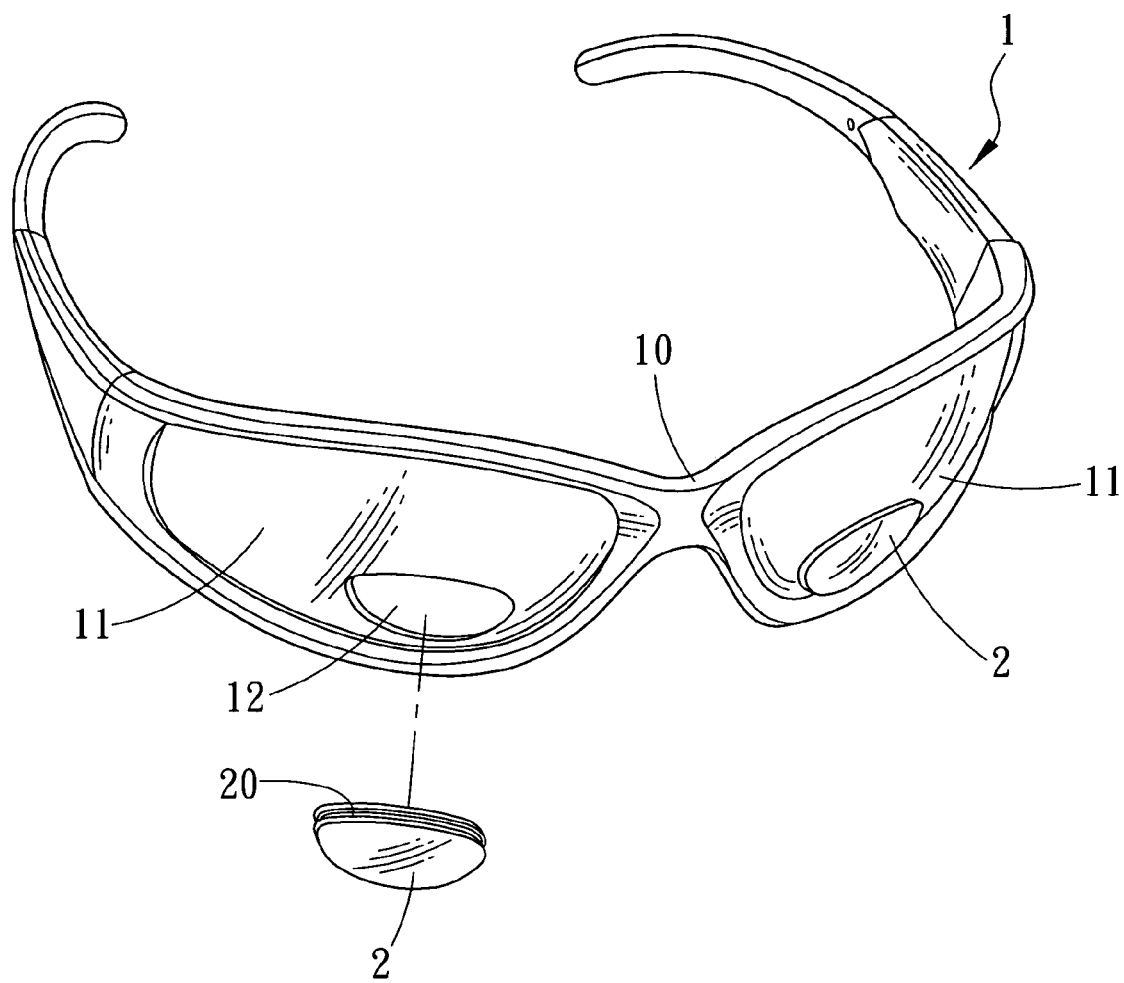
FIG. 1 is a perspective view of glasses in the present invention.
Figure 2:
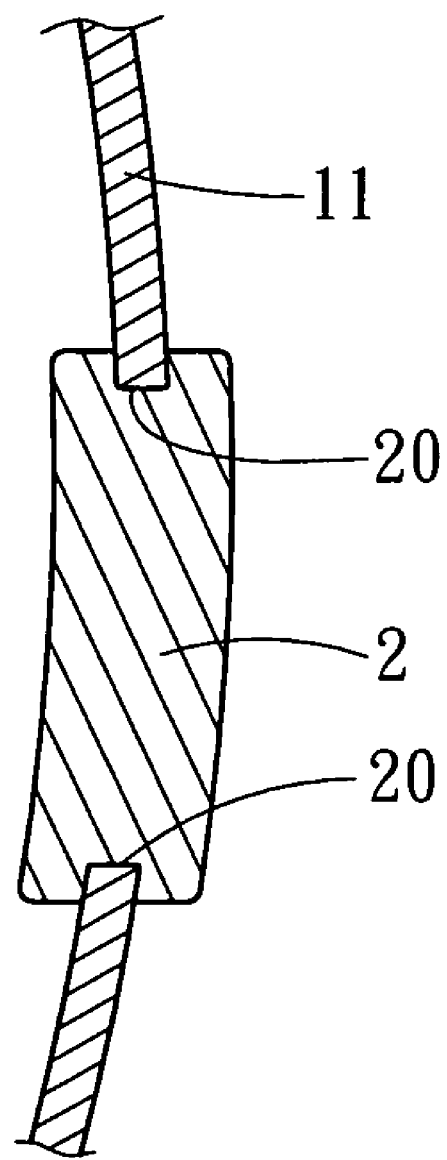
FIG. 2 is a cross-sectioned view of the glasses in assembly in the present invention.

A preferred embodiment of a pair of sunglasses with farsighted lenses in the present invention, as shown in FIGS. 1 and 2, includes mainly a main body 1, which is provided with a frame 10 surrounding two separate areas. Each of the areas is occupied by a plastic sunglass 11 having an opening 12 that, cut at its lower and inner part, is to be filled with a farsighted lens 2. The farsighted lens 2 has a fixing groove 20 around its circumference for fitting with the circumferential edge of the opening 12. The farsighted lens 2 is wider than the sunglass 11 and the farsighted lens 2 has an H shape cross section receiving an edge of the opening 12.

When one wears the pair of sunglasses of the present invention for outdoors activities, such as fishing and hooking a bait, he can use the sunlight glasses 11 to protect eyes and use the farsighted lenses 2 to see objects near by, without need of preparing two pairs of glasses.

While the preferred embodiment of the invention has been described above, it will be recognized and understood that various modifications may be made therein and the appended claims are intended to cover all such modifications that may fall within the spirit and scope of the invention.

What is claimed is:

1. A pair of sunglasses with farsighted lenses comprising: a main body having a frame, said frame surrounding two separate areas, each said area occupied by a sunglass provided with an opening at its lower and inner part for filling with a farsighted lens, which is provided with a fixing groove around its circumference for fitting with the circumferential edge of said opening; where the farsighted lens is wider than the sunglass and the farsighted lens has an H shape cross section receiving an edge of the opening.

2. A pair of sunglasses with farsighted lenses as claimed in claim 1, wherein said sunglasses are made of plastics.

3. A pair of sunglasses with farsighted lenses as claimed in claim 1, wherein said farsighted lenses are made of plastics.

* * * * *